US006877953B2

United States Patent
Guemmer

(10) Patent No.: US 6,877,953 B2
(45) Date of Patent: Apr. 12, 2005

(54) GAS TURBINE

(75) Inventor: Volker Dr. Guemmer, Mahlow (DE)

(73) Assignee: Rolls-Royce Deutschland Ltd & Co KG, Blankenfelde-Mahlow (DE)

(*) Notice: Subject to any disclaimer, the term of this patent is extended or adjusted under 35 U.S.C. 154(b) by 0 days.

(21) Appl. No.: 10/358,361

(22) Filed: Feb. 5, 2003

(65) Prior Publication Data

US 2003/0152456 A1 Aug. 14, 2003

(30) Foreign Application Priority Data

Feb. 8, 2002 (DE) .......................................... 102 05 363

(51) Int. Cl.[7] .............................................. F01D 25/24
(52) U.S. Cl. ..................... 415/216.1; 415/221; 415/914
(58) Field of Search ............................. 415/173.1, 221, 415/914, 216.1

(56) References Cited

U.S. PATENT DOCUMENTS

| 4,086,022 A | * | 4/1978 | Freeman et al. ............. 415/119 |
| 4,645,417 A | * | 2/1987 | Wisler ...................... 415/173.1 |
| 5,137,419 A | * | 8/1992 | Waterman ................. 415/170.1 |
| 5,762,470 A | * | 6/1998 | Gelmedov et al. ......... 415/57.4 |

* cited by examiner

*Primary Examiner*—Ninh H. Nguyen
(74) *Attorney, Agent, or Firm*—Harbin King & Klima

(57) ABSTRACT

A gas turbine with a compressor area has a rotor shaft 2 to carry rotor blades 1 and a casing 4 to carry stator vanes 3, with the related rotor blades 1 and stator vanes 3 forming an axial clearance space 5 between one another, wherein, in the area of the axial clearance space 5, at least one wall of the rotor shaft 2 and/or of the casing 4 is provided with an arrangement of fins 6 which are inclined against the axial direction.

33 Claims, 5 Drawing Sheets

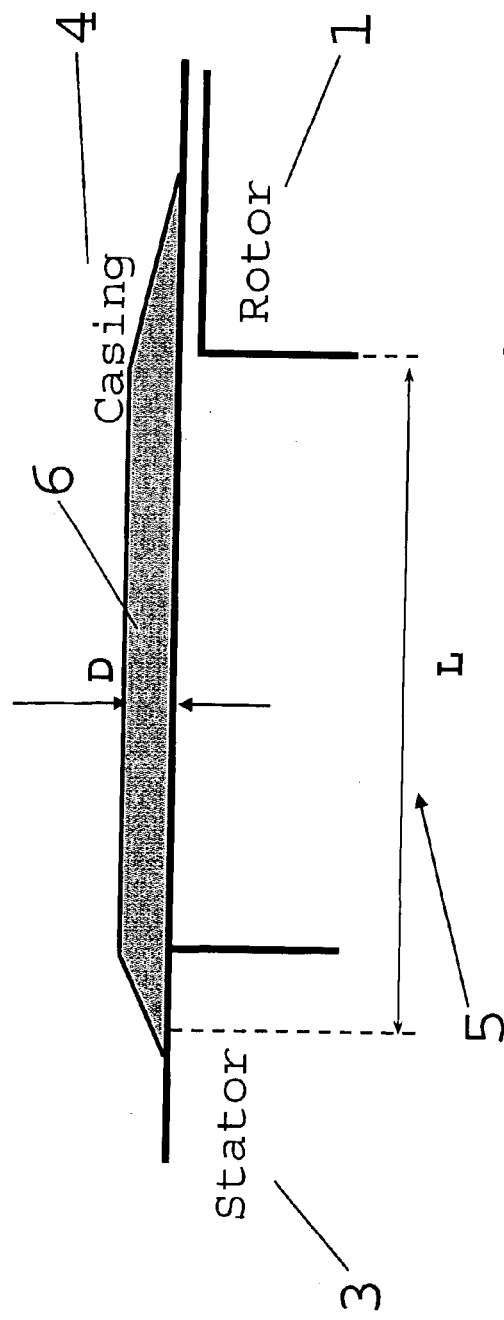
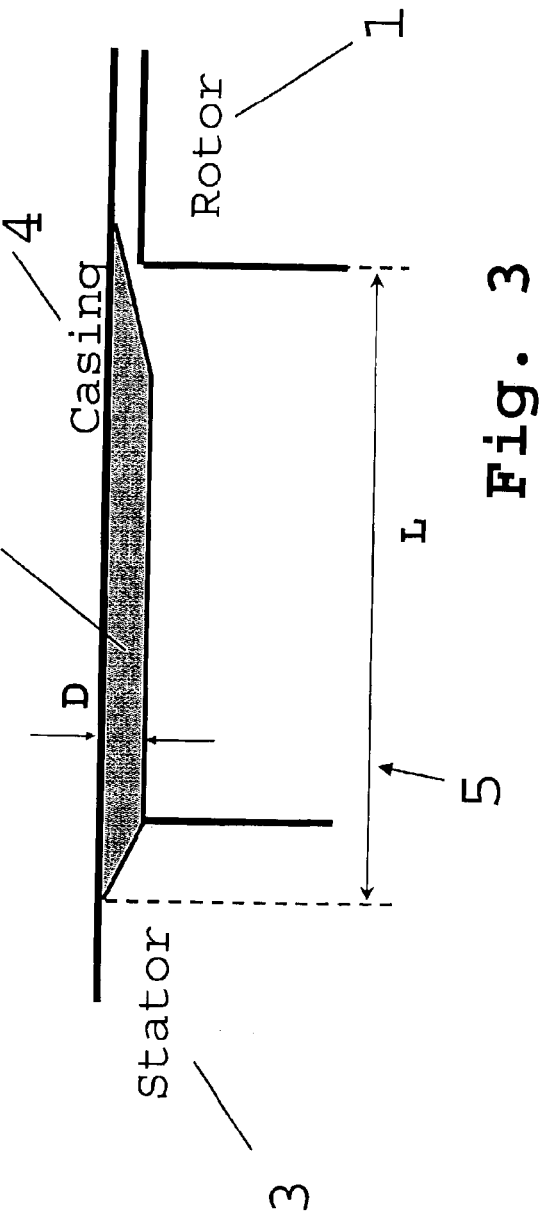
Fig. 2
Fig. 3

GAS TURBINE

This application claims priority to German Patent Application DE10205363.4 filed Feb. 8, 2002, the entirety of which is incorporated by reference herein.

BACKGROUND OF THE INVENTION

This invention relates to a gas turbine.

More particularly, the present invention relates to a gas turbine with a compressor area which has a rotor shaft to carry the rotor blades and a casing to carry stator vanes, with related rotor blades and stator vanes forming an axial clearance space between one another. Within the framework of the present invention the term compressor area shall be read to apply to the portion of either a fan or a compressor.

The aerodynamic loading of fans and compressors of aero engines and stationary gas turbines is limited by the requirement of sufficient flow stability. The loading of the individual compressor stages may, however, be increased by taking special measures against flow stall or surge.

The present invention relates to the design of the walls of both the rotor shaft and the casing in the compressor area specified.

The present invention further relates to compressor areas of the axial, semi-axial or radial types.

In accordance with the present invention, one or more compressor areas are provided, each comprising a rotor-stator configuration or a stator-rotor configuration. The rotor here is formed by a number of rotor blades attached to a rotor shaft and the stator is formed by a number of stator vanes attached to a casing. In this respect, both the rotor and the stator correspond to the designs known from the state of the art.

In accordance with the present invention, the stator vanes may also have the form of intake guide vanes.

The characteristics of the pressure ratio and of the mass flow shown by a partial or complete compressor at constant rotational speed have a negative gradient throughout a larger flow-value range. When mass flow is reduced, the characteristics become more and more flat and the sign of the gradient changes from negative to positive. This is normally the point at which the compressor becomes unstable and enters into a state of rotary flow stall or surge, respectively. These two operating states delimit the operating range of the compressor and may result in the compressor or the entire gas turbine being damaged.

Various solutions are proposed in the state of the art to avoid the above disadvantages:

A first measure is to produce slots, grooves, bores or ducts in the casing wall which are situated partly or wholly in the area of the aerofoil ends of the rotor blades.

A further measure is to produce slots, grooves, bores or ducts in the wall of the rotor shaft which are situated wholly or partly in the area of the stator vanes.

As a third measure, it was proposed to provide means for the detachment of the casing-near flow before or within the path of movement of the rotor blades, these means being known as separators.

The measures known from the state of the art are provided on an essential portion of the circle of movement or the area of movement of the rotor blades or the stator vanes, respectively. Accordingly, they are provided either above the rotor in the area of the rotor blade ends or below the stator in the area of the stator vane ends. These arrangements cause an unsteady disturbance of the flow in the area of the radial gaps of the rotor blades or the stator vanes, respectively. This leads to a considerable efficiency loss. Furthermore, mechanical problems during manufacturing as well as vibration-related problems will be encountered. In summary, all of the known measures are extremely cost-intensive to manufacture.

BRIEF SUMMARY OF THE INVENTION

In a broad aspect, the present invention provides a gas turbine of the type specified at the beginning above which combines simple design with easy and cost-effective production, features a high degree of flow stability and avoids efficiency losses. The underlying operating principle of casing and hub structures according to the state of the art is a pulsating inflow and outflow mechanism requiring axial overlap of the blade/vane and the wall structure, while the present invention ensures a flow which is both continuous and well-guided in the near-wall region, thus providing for improved pre-conditioning of the respective rotor or stator inflow.

It is a particular object of the present invention to provide a solution to the above problems by the combination of the features described herein, with further aspects and advantages of the present invention being described below.

The present invention accordingly provides for at least one wall of the rotor shaft or of the casing in the area of the axial clearance space being provided with an arrangement of fins which are inclined against the axial direction.

The arrangement according to the present invention is characterized by a variety of merits.

First, the present invention follows a path which, in terms of the operating principle, is basically different from the solutions known from the state of the art.

Unlike in known designs, the flow at the free end of the rotor blades or the flow at the free end of the stator vanes is here influenced by the area provided with fins, this area being situated outside of the radial gap formed by the rotor blades or the stator vanes, respectively.

The design according to the present invention provides for a directionally stabilizing conduction of flow upstream of the respective blade/vane row. Contrarily, the grooves or slots known from the state of the art act as recesses which overlap axially with the respective blade/vane rows and, due to strong interactive effects, entail high flow losses.

Accordingly, the present invention provides for a continual conduction or guidance of the near-wall flow, considerably delaying the formation of stall at the free ends of the rotor blades or stator vanes and generally providing for more stable flow characteristics. The advantages of the present invention become apparent under part-load operating conditions, in particular, with compressor efficiency being maintained at the level of those designs with smooth casing or rotor-shaft walls adjacent to the rotor blades or stator vanes, respectively.

The above advantages allow for a reduction of the number of compressor stages by approx. 30 percent below the state of the art, with performance remaining constant. This results in a weight saving of 30 percent and a corresponding cost saving of approx. 20 percent.

In accordance with the present invention, it is particularly favourable if the fins are essentially parallel to each other. The fins may be either straight or curved.

The inventive arrangement may be applied either individually or in combination. This means that the fins can be provided on the wall of either the rotor shaft or the casing or on both.

In accordance with the present invention, the fins can have a constant cross-section along their length or they can be varied in cross-section along their length. Accordingly, it is also possible to vary the radial height of the fins between 0.5 and 10 percent of the annulus height. Alternatively, the radial height of the fins may be made two to eight times as large as the radial gap between the rotor blade and the casing or the radial gap between the stator vane and the rotor shaft, respectively. Referenced to a line extending radially from the machine axis, it can be advantageous to orientate the side flanks of the fins at an angle different from zero.

With regard to the width of adjacent fins, it can be particularly favourable if their width, as summed up in the circumferential direction, is between 30 percent and 1 percent of the circumference (fin width as related to the width of fin plus fin interspace=30 percent to 1 percent).

The number of fins or the number of fin interspaces (pockets) can preferably be at least twice the number of the related, downstream rotor blades or stator vanes of the respective compressor area.

In order to improve the flow behaviour, it can be advantageous to incline the fins or the fin interspaces relative to the axial direction of the gas turbine.

The free ends of the fins can either be rounded or chamfered to provide for undisturbed flow-off.

In accordance with the present invention, the fins can be produced by material removal (milling or similar process) or by material deposition (build-up welding or similar process). In this respect, the present invention can be adapted to most different technologies.

BRIEF DESCRIPTION OF THE DRAWINGS

This invention is more fully described in the light of the accompanying drawings showing preferred embodiments. In the drawings:

FIG. 2 is an enlarged representation of an area of fins produced by material removal in a casing, FIG. 3 is a representation, analogically to FIG. 2, with the fins produced by material deposition.

DETAILED DESCRIPTION OF THE INVENTION

Figure 1:
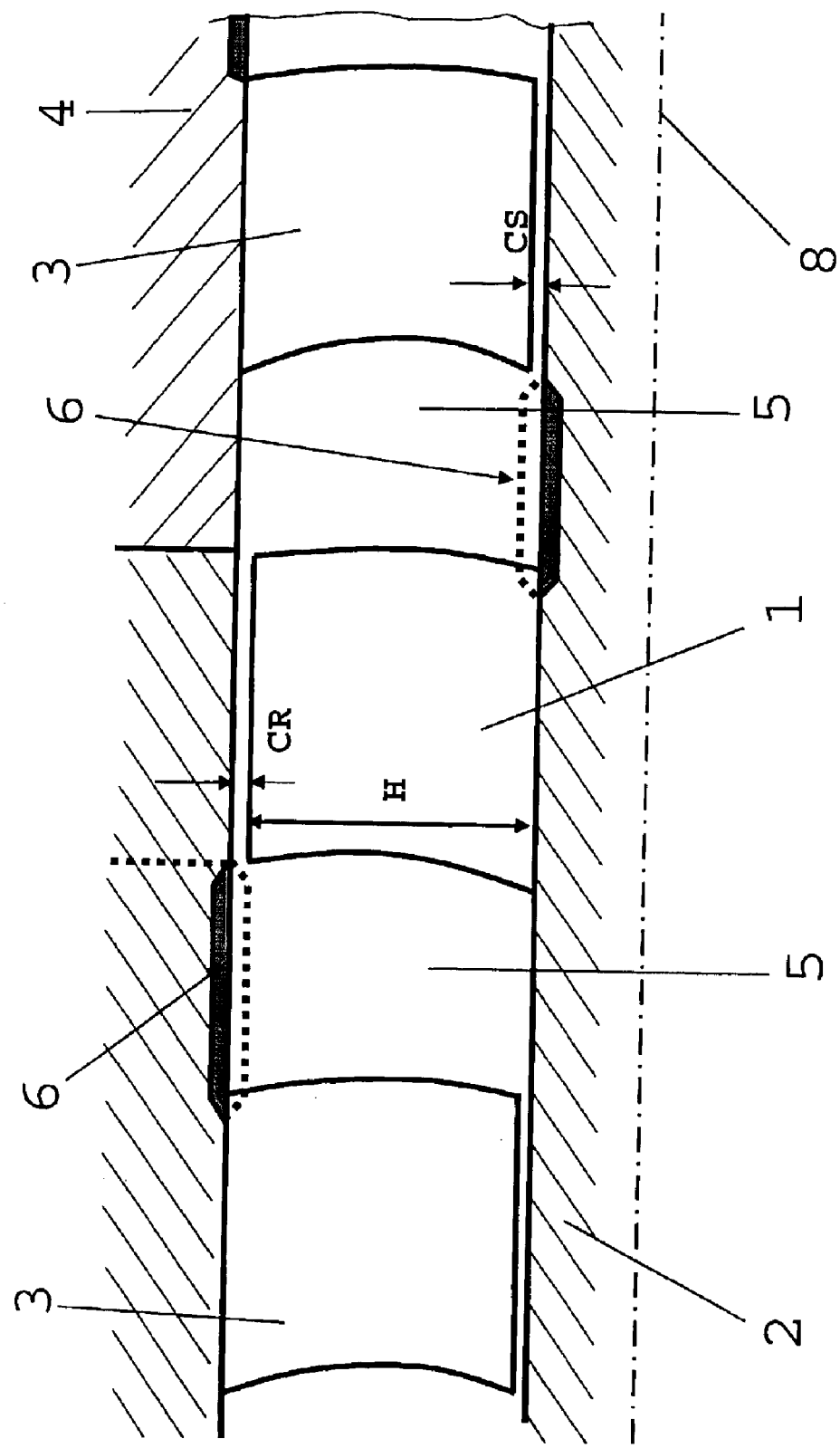
FIG. 1 is a simplified schematic side sectional view of a compressor area of a gas turbine in accordance with the present invention.

This detailed description should be read in conjunction with the summary of the invention above. FIG. 1 is a schematic side view of a partial area of a compressor area in accordance with the present invention. Reference numeral 8 indicates a rotational axis of the gas turbine around which a rotor shaft 2 is rotatable and to which, in turn, a number of rotor blades 1 are attached. These are surrounded by a casing 4 which carries several arrangements of stator vanes 3.

The free space between the casing 4 and the rotor shaft 2 is marked H. The distance between the free ends of the rotor blades 1 and the casing 4 is marked CR, and the distance between the free ends of the stator vanes 3 and the rotor shaft 2 is marked CS.

The stator vanes 3 and rotor blades 1 form a clearance space 5 in which a number of fins 6 are provided, these fins being described hereinafter. The fins 6 represented in FIG. 2 can be produced by material removal (for example by milling or a similar process). The height of the fins 6 is marked D. Reference numeral L indicates the axial length of the fins 6.

FIG. 3 shows a variation of the representation of FIG. 2 in which the fins 6 are produced by material deposition (build-up welding or similar process).

Figure 4:
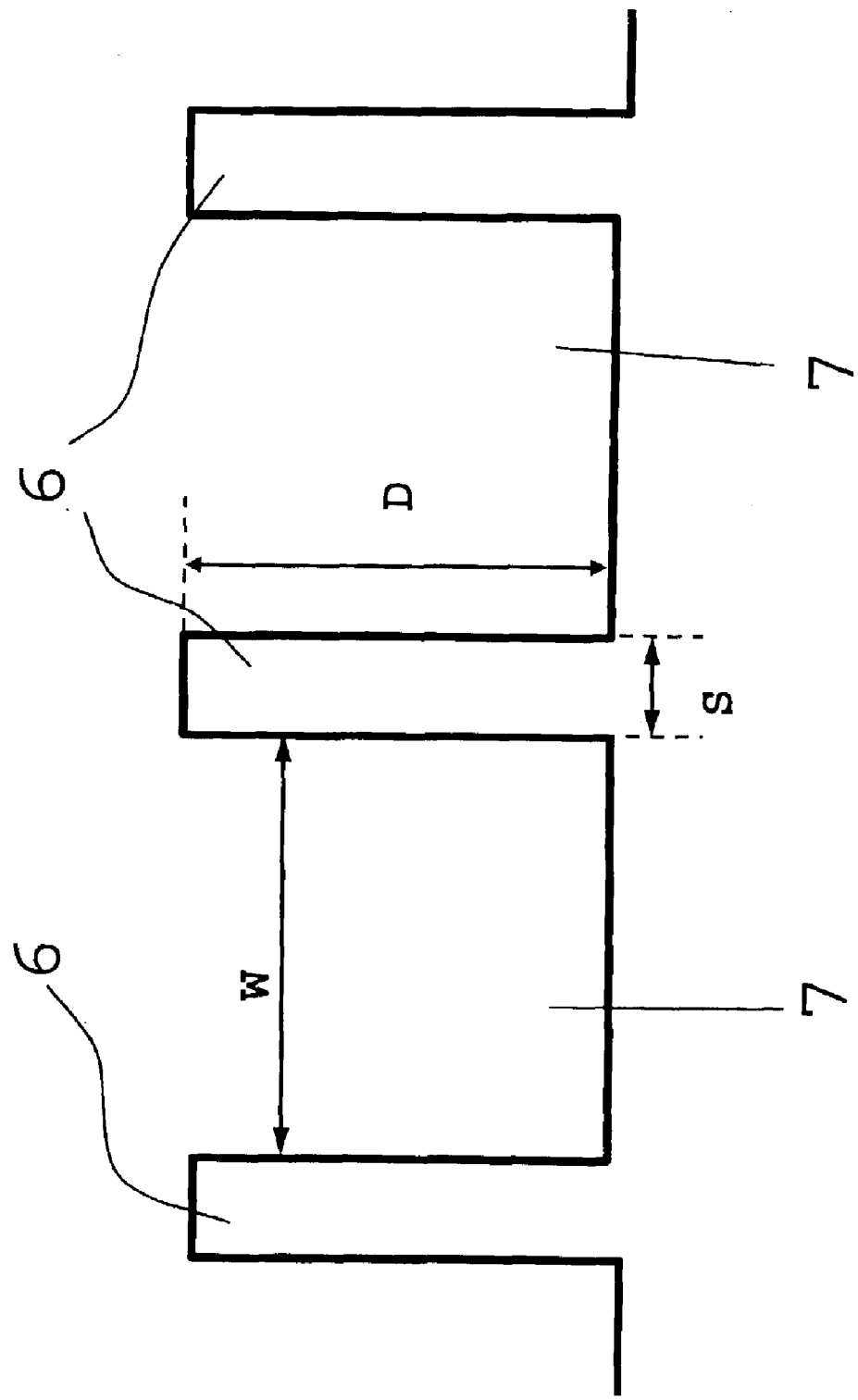
FIG. 4 is a front view of an embodiment of the fins.

FIG. 4 shows an axial front view of adjacent fins 6 with an interspace (pocket, groove) 7 formed between each of them. The width of the fins 6 in circumferential direction is marked S, while the width of the fin interspaces is marked W. FIG. 4 again shows the height D of the fins 6.

The radial height of the fins 6 in the axial direction is either constant or variable, for example within a range of 0.5 percent to 10 percent of the annulus height. Also, the depth D can be made at least twice the radial gap height CR or CS of the respective downstream arrangement of rotor blades 1 or stator vanes 3, respectively. Therefore, the resultant ratio D/CR or D/CS, respectively, is 2 to 8.

The accumulated material thickness of the fins 6 that provide for the conduction of flow is no more than 30 percent of the total circumferential value, i.e. S/(W+S)=30 to 1 percent.

The number of fins 6 or fin interspaces 7, respectively, is at least twice the number of rotor blades or stator vanes, respectively, in the downstream row.

Figure 5:
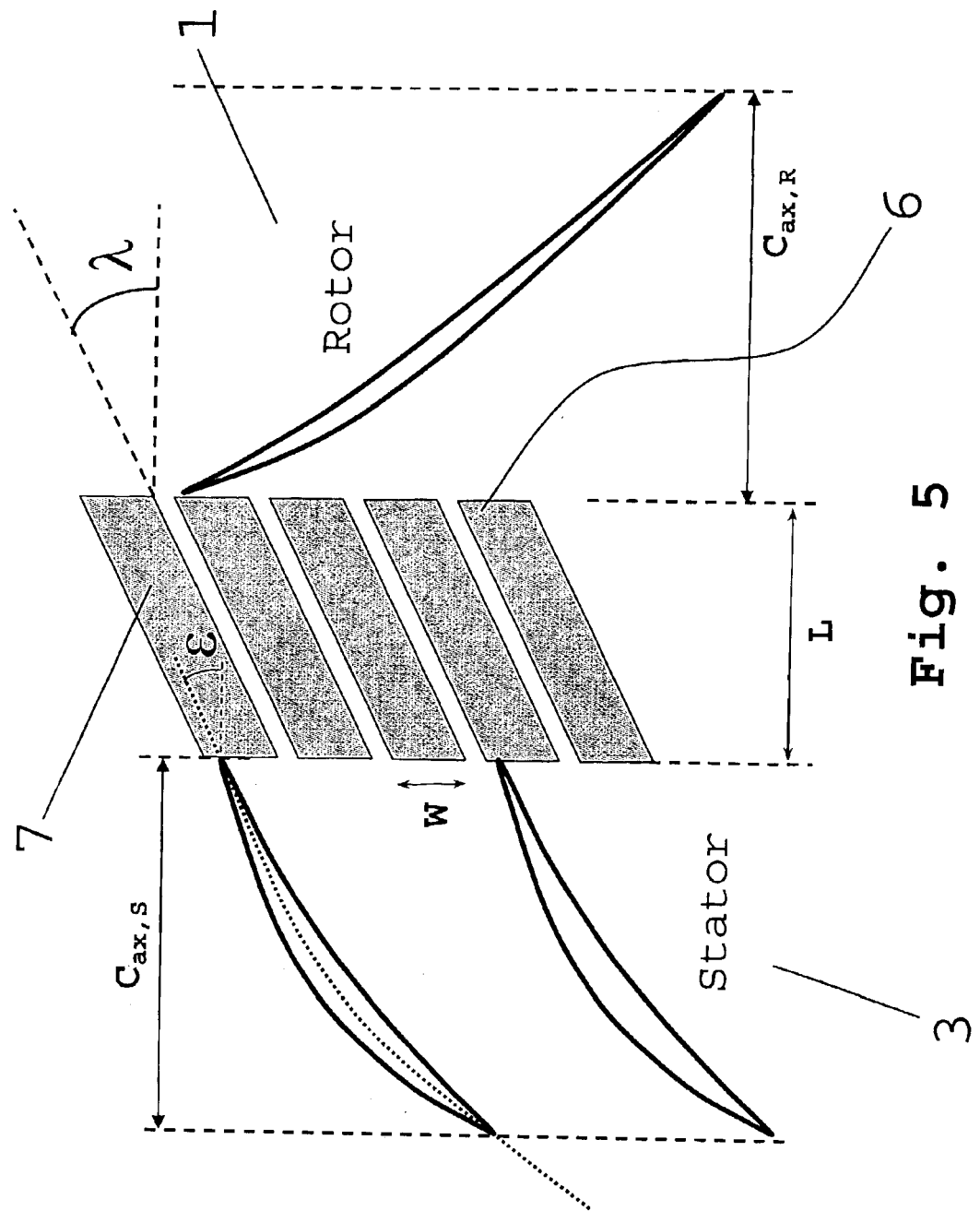
FIG. 5 is a simplified side view of the fins according to the present invention with a stator vane and a rotor blade, with the fins being provided on a casing.
Figure 6:
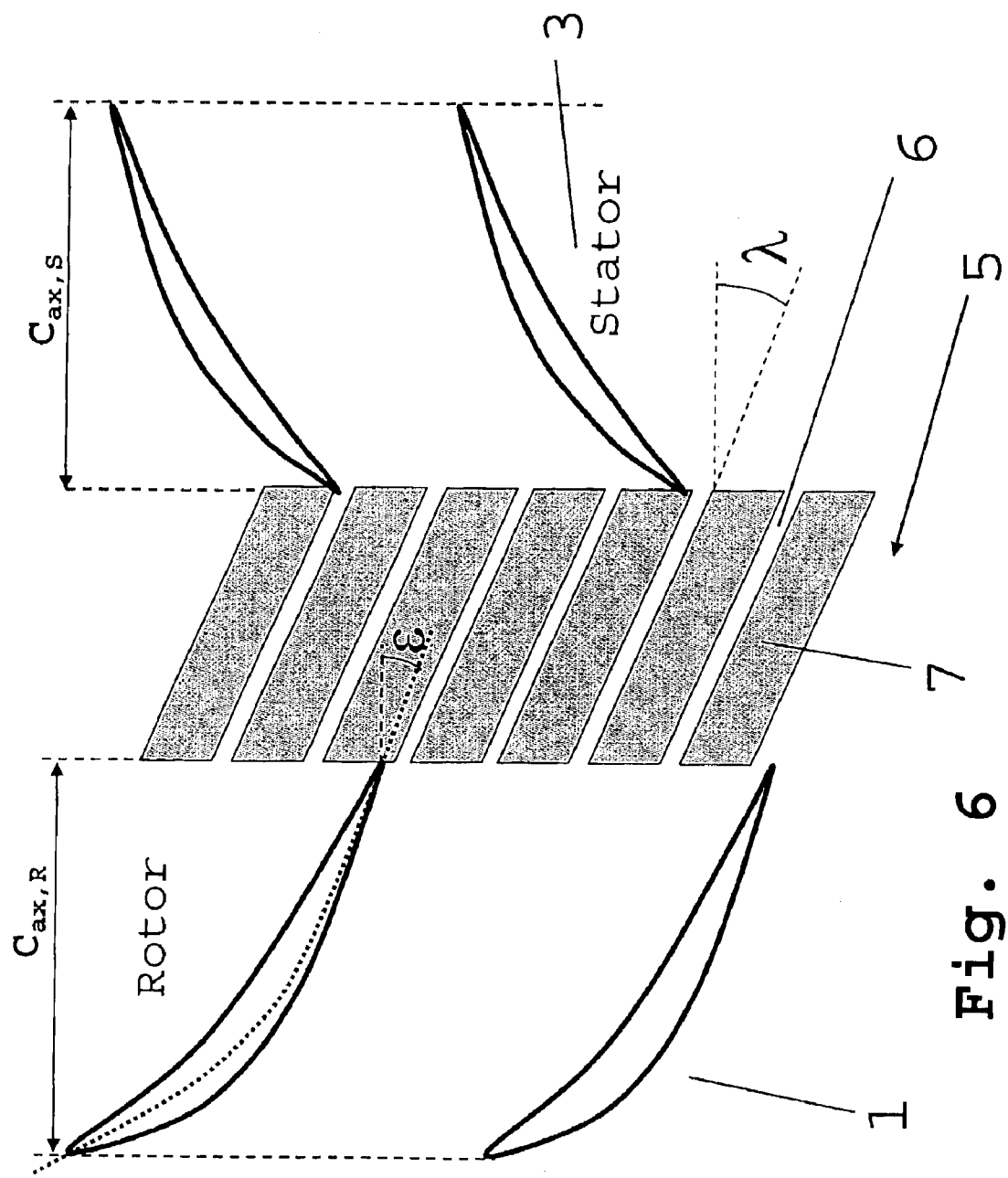
FIG. 6 is a view, similar to FIG. 5, with the fins being provided on the rotor shaft.

FIGS. 5 and 6 show different arrangements, with FIG. 5 showing the arrangement of the fins 6 on the casing 4 and FIG. 6 showing the arrangement of the fins 6 on the rotor shaft 2.

FIG. 5 shows a form in which the fins 6 start in an area of the trailing edge of the stator vanes 3, at no more than 30 percent of the axial chord length of the stator vanes. The fins merely extend to the leading edge of the following rotor blades 1. The inclination of the fins 6 or the fin interspaces 7, respectively, in relation to the axial direction (angle λ) corresponds to the outflow angle ε, with a deviation of ±25° being possible. Angle ε also indicates the tangent angle of the curvature line of the stator vane 3.

FIG. 6 then shows that the fins 6 or fin interspaces 7, respectively, start in the area of the trailing edge of the rotor blade 1. The fins 6 or the fin interspaces 7 merely extend to the leading edge of the following stator vanes 3. The inclination of the fins 6 or the fin interspaces 7, respectively, in relation to the axial direction (angle λ) corresponds to the outflow angle ε, which, in turn, is the tangent angle to the profile of the rotor blade 1. Here again, a range of ±25° is possible.

What is claimed is:

1. A gas turbine with a compressor area which has a rotor shaft carrying rotor blades and a casing carrying stator vanes, with adjacent rotor blades and stator vanes forming an axial clearance space between one another, wherein, in the area of the axial clearance space, an arrangement of fins inclined against an axial direction of the gas turbine is provided on at least one of a wall of the rotor shaft and a wall of the casing, the arrangement of fins extending radially into the axial clearance space.

2. A gas turbine in accordance with claim 1, wherein the fins are essentially parallel to each other.

3. A gas turbine in accordance with claim 1, wherein the fins are essentially straight.

4. A gas turbine in accordance with claim 1, wherein the fins are essentially curved.

5. A gas turbine in accordance with claim 1, wherein the fins are provided on the wall of the rotor shaft only.

6. A gas turbine in accordance with claim 1, wherein the fins are provided on the wall of the casing only.

7. A gas turbine in accordance with claim 1, wherein the fins are provided both on the wall of the rotor shaft and on the wall of the casing.

8. A gas turbine in accordance with claim 1, wherein the fins have a constant cross-section over their length.

9. A gas turbine in accordance with claim 1, wherein the fins have a varying cross-section over their length.

10. A gas turbine in accordance with claim 9, wherein a radial height of the fins is 0.5 percent to 10 percent of an annulus duct height and is variable along its length.

11. A gas turbine in accordance with claim 10, wherein the radial height of the fins is two to eight times as large as at least one of a radial gap between the rotor blades and the casing and a radial gap between the stator blades and the rotor shaft, respectively.

12. A gas turbine in accordance with claim 11, wherein a fin width, as viewed in a circumferential direction, is 30 to 1 percent of the sum of fin interspace width and fin width.

13. A gas turbine in accordance with claim 12, wherein the number of fins is at least twice the number of related, downstream rotor blades or stator vanes, respectively.

14. A gas turbine in accordance with claim 13, wherein at least one of the fins and the fin interspaces, respectively, are inclined in relation to the axial direction of the gas turbine.

15. A gas turbine in accordance with claim 14, wherein free edges of the fins are rounded.

16. A gas turbine in accordance with claim 14, wherein free edges of the fins are chamfered.

17. A gas turbine in accordance with claim 14, wherein side flanks of the fins are orientated in parallel with a line extending radially from an axis of the rotor shaft.

18. A gas turbine in accordance with claim 14, wherein side flanks of the fins are orientated at an angle different from zero relative to a line extending radially from an axis of the rotor shaft.

19. A gas turbine in accordance with claim 1, wherein the fins are produced by material removal.

20. A gas turbine in accordance with claim 1, wherein the fins are produced by material deposition.

21. A gas turbine in accordance with claim 1, wherein a radial height of the fins is 0.5 percent to 10 percent of an annulus duct height and is variable along its length.

22. A gas turbine in accordance with claim 1, wherein the radial height of the fins is two to eight times as large as at least one of a radial gap between the rotor blades and the casing and a radial gap between the stator blades and the rotor shaft, respectively.

23. A gas turbine in accordance with claim 1, wherein a fin width, as viewed in a circumferential direction, is 30 to 1 percent of the sum of fin interspace width and fin width.

24. A gas turbine in accordance with claim 1, wherein the number of fins is at least twice the number of related, downstream rotor blades or stator vanes, respectively.

25. A gas turbine in accordance with claim 1, wherein at least one of the fins and the fin interspaces, respectively, are inclined in relation to the axial direction of the gas turbine.

26. A gas turbine in accordance with claim 1, wherein free edges of the fins are rounded.

27. A gas turbine in accordance with claim 1, wherein free edges of the fins are chamfered.

28. A gas turbine in accordance with claim 1, wherein side flanks of the fins are orientated in parallel with a line extending radially from an axis of the rotor shaft.

29. A gas turbine in accordance with claim 1, wherein side flanks of the fins are orientated at an angle different from zero relative to a line extending radially from an axis of the rotor shaft.

30. A gas turbine in accordance with claim 1, wherein an inclination of at least one of the fins and the fin interspaces, respectively, in relation to the axial direction of the gas turbine corresponds to an outflow angle $\epsilon$, which, in turn, is a tangent angle to a profile of the rotor blades.

31. A gas turbine in accordance with claim 30, wherein the inclination is within a range of ±25°.

32. A gas turbine in accordance with claim 1, wherein an inclination of at least one of the fins and the fin interspaces, respectively, in relation to the axial direction of the gas turbine corresponds to an outflow angle $\epsilon$, which, in turn, is a tangent angle of a curvature line of the stator vanes.

33. A gas turbine in accordance with claim 32, wherein the inclination is within a range of ±25°.

* * * * *